United States Patent
Baltz et al.

(10) Patent No.: US 6,321,318 B1
(45) Date of Patent: *Nov. 20, 2001

(54) USER-CONFIGURABLE ON-CHIP PROGRAM MEMORY SYSTEM

(75) Inventors: Philip K. Baltz; Ray L. Simar, Jr., both of Houston, TX (US)

(73) Assignee: Texas Instruments Incorporated, Dallas, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/212,894

(22) Filed: Dec. 15, 1998

Related U.S. Application Data

(60) Provisional application No. 60/070,218, filed on Dec. 31, 1997.

(51) Int. Cl.[7] .................................................. G06F 12/00
(52) U.S. Cl. ........................................... 711/170; 711/154
(58) Field of Search ..................................... 711/170, 100, 711/118

(56) References Cited

U.S. PATENT DOCUMENTS

| | | | |
|---|---|---|---|
| 5,586,293 | * 12/1996 | Baron et al. | 711/118 |
| 5,721,862 | * 2/1998 | Sartore et al. | 711/118 |
| 5,819,305 | * 10/1998 | Nixon | 711/100 |

* cited by examiner

Primary Examiner—Do Hyun Yoo
Assistant Examiner—Nasser Moazzami
(74) Attorney, Agent, or Firm—Robert D. Marshall, Jr.; W. James Brady, III; Frederick J. Telecky, Jr.

(57) ABSTRACT

A processor structure and method of operation are disclosed that comprise a user-configurable on-chip program memory system. The memory system comprises an on-chip memory 31 and a program memory controller 30 that reconfigures memory 31 in response to control values that may be modified by CPU core 20 under program control. In one mode, memory 31 may be mapped into internal address space. In other modes, memory 31 may be configured as an on-chip cache. In conjunction with the cache configuration, the program memory controller may comprise a tag RAM that is initialized upon a transition to cache mode. Program memory controller 30 handles memory mode transitions and data requests; CPU core 20 preferably requests stored instructions from controller 30 in a uniform fashion regardless of memory mode.

8 Claims, 5 Drawing Sheets

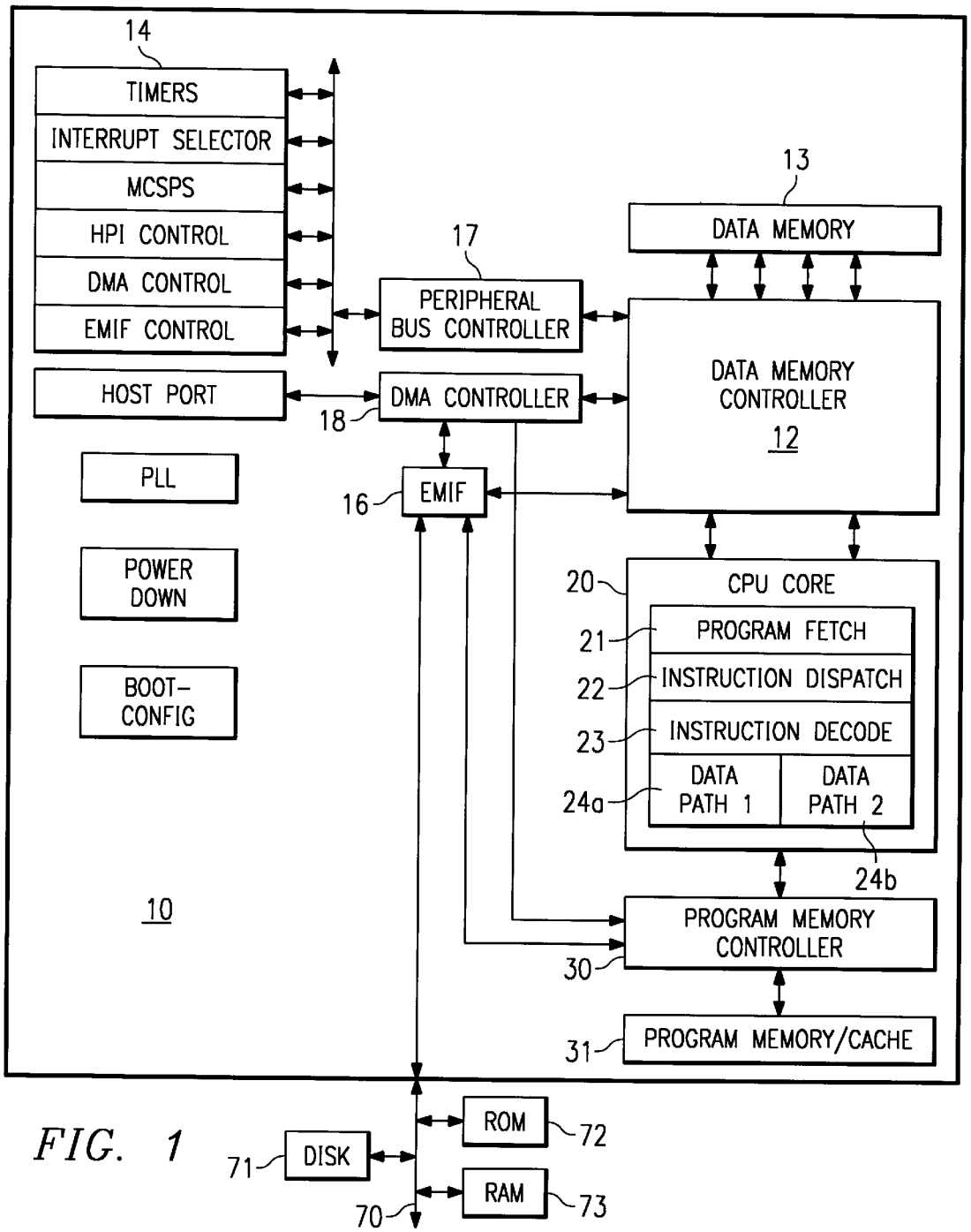
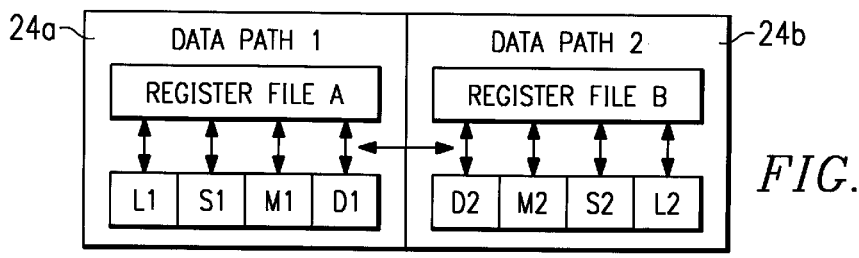
FIG. 1
FIG. 2

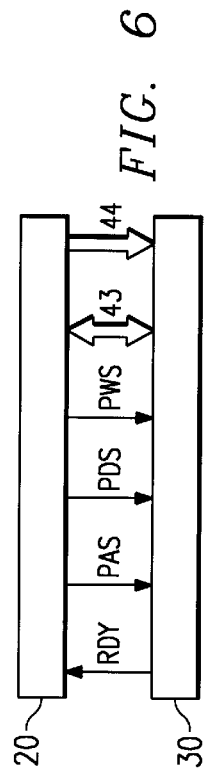

MEMORY MAP 1

| STARTING ADDRESS | | BLOCK SIZE (BYTES) |
|---|---|---|
| 000 0000 | INTERNAL PROGRAM RAM | 64K |
| 001 0000 | RESERVED | 4M |
| 040 0000 | EXTERNAL MEMORY SPACE CE0 | 16M |
| 140 0000 | EXTERNAL MEMORY SPACE CE1 | 4M |
| 180 0000 | SAME AS MEMORY MAP 0 | |
| 1 0000 0000 | | |

FIG. 4b

MEMORY MAP 0

| STARTING ADDRESS | | BLOCK SIZE (BYTES) |
|---|---|---|
| 000 0000 | EXTERNAL MEMORY SPACE CE0 | 16M |
| 100 0000 | EXTERNAL MEMORY SPACE CE1 | 4M |
| 140 0000 | INTERNAL PROGRAM RAM | 64K |
| 141 0000 | RESERVED | 4M |
| 180 0000 | INTERNAL PERIPHERAL SPACE | 4M |
| 1C0 0000 | RESERVED | 4M |
| 200 0000 | EXTERNAL MEMORY SPACE CE2 | 32M |
| 400 0000 | RESERVED | 1 984M |
| 8000 0000 | INTERNAL DATA RAM | 64K |
| 8001 0000 | RESERVED | 4M |
| 8040 0000 | RESERVED | 2 044M |
| 1 0000 0000 | | |

FIG. 4a

USER-CONFIGURABLE ON-CHIP PROGRAM MEMORY SYSTEM

This application claims priority under 35 USC §119(e)(1) of Provisional Application No. 60/070,218, filed Dec. 31, 1997.

FIELD OF THE INVENTION

The present invention pertains generally to microprocessor architectures, and pertains more particularly to microprocessors having on-chip program memory capability.

BACKGROUND OF THE INVENTION

A microprocessor is a circuit that combines the instruction-handling, arithmetic, and logical operations of a computer on a single chip. A digital signal processor (DSP) is a microprocessor optimized to handle large volumes of data efficiently. Such processors are central to the operation of many of today's electronic products, such as high-speed modems, high-density disk drives, digital cellular phones, and complex automotive systems, and will enable a wide variety of other digital systems in the future. The demands placed upon DSPs in these environments continue to grow as consumers seek increased performance from their digital products.

Designers have succeeded in increasing the performance of DSPs and microprocessors in general by increasing clock speeds, by removing architectural bottlenecks in circuit designs, by incorporating multiple execution units on a single processor circuit, and by developing optimizing compilers that schedule operations to be executed by the processor in an efficient manner. As further increases in clock frequency become more difficult to achieve, designers have embraced the multiple execution unit processor as a means of achieving enhanced DSP performance. For example, FIG. 2 shows a block diagram of the CPU data paths of a DSP having eight execution units, L1, S1, M1, D1, L2, S2, M2, and D2. These execution units operate in parallel to perform multiple operations, such as addition, multiplication, addressing, logic functions, and data storage and retrieval, simultaneously.

Theoretically, the performance of a multiple execution unit processor is proportional to the number of execution units available. However, utilization of this performance advantage depends on the efficient scheduling of operations so that most of the execution units have a task to perform each clock cycle. Efficient scheduling is particularly important for looped instructions, since in a typical runtime application the processor will spend the majority of its time in loop execution.

Unfortunately, the inclusion of multiple execution units also creates new architectural bottlenecks. Increased functionality translates into longer instructions, such as may be found in very long instruction word (VLIW) architectures. For example, the eight-execution unit VLIW processor described above may require a 256-bit instruction every clock cycle in order to perform tasks on all execution units. As it is generally neither practical nor desirable to provide, e.g., a 256-bit-wide parallel data path external to the processor merely for instruction retrieval, the data rate available for loading instructions may become the overall limiting factor in many applications. An object of the present invention is to resolve this bottleneck.

SUMMARY OF THE INVENTION

Many high performance signal processors provide at least some program memory on-chip because of the delays associated in loading instructions from external memory. However, the area on a microprocessor allotted for on-chip memory is by necessity limited, and prior art on-chip memories provide no ability to reconfigure this limited and precious resource. The present invention seeks to solve a heretofore unrecognized problem—given that the core functionality of some applications can be loaded on-chip to a sufficiently-sized memory, while the core functionality of others cannot, can an on-chip memory be designed to meet the needs of either type of application, without duplicating and possibly wasting resources? It has now been recognized that an on-chip memory that is configurable by the user, preferably in software, will provide the maximum flexibility for all applications. The present invention provides a microprocessor with an on-chip memory that may be configured at runtime to one of several memory modes as requested by an application.

In one aspect of the present invention, a microprocessor is disclosed that comprises a configurable on-chip memory. Preferably, the microprocessor further comprises a program memory controller that allows the current on-chip memory configuration to remain transparent to the microprocessor central processing unit (CPU) core during program memory operations. Preferably, the configurable on-chip memory may be configured as either memory-mapped or cache memory. The cache memory may preferably be further configured to operate in multiple modes, e.g., fully enabled, bypassed, or read-only.

In a second aspect of the invention, the configurable on-chip memory may be reconfigured during microprocessor operation under software control. For instance, a configurable memory may be booted in one mode, and subsequently switched, once or multiple times, to other modes, by software commands executed by the CPU of the microprocessor. Such software commands preferably alter the operation of the program memory controller and on-chip memory by changing a control signal on the microprocessor.

In yet another aspect of the invention, the program memory controller (PMC) operates in either a memory-mapped mode or a cache mode to determine if requested addresses are on-chip memory addresses. The program memory controller preferably supplies requested fetch packets if on-chip, or halts the processor and loads requested fetch packets from off-chip. The PMC checks for requests for memory mode transitions and initiates transitions when the CPU requests such.

In a further aspect of the present invention, a tag RAM is associated with cache memory operation. This tag RAM preferably operates in conjunction with the program memory controller, which determines if the fetch packet at the requested address is currently loaded into the cache. The program memory controller preferably has the capability to update the tag RAM when a fetch packet is loaded from off-chip. The program memory controller preferably also has the capability to re-initialize the tag RAM during microprocessor operation, e.g., due to a switch in memory configuration.

BRIEF DESCRIPTION OF THE DRAWINGS

The invention may be best understood with reference to the drawing, wherein:

FIG. 1 is a block diagram depicting the major functional blocks of a processor implementation according to the present invention;

FIG. 2 is a block diagram illustrating a configuration of execution units and registers of a multiple-execution unit processor;

FIG. 3 shows the arrangement of instructions in a fetch packet;

FIGS. 4a and 4b show maps of processor address space for two different memory mappings;

FIG. 5 depicts instruction address partitioning for use as a cache address;

FIG. 6 depicts the interface between the CPU core and the program memory controller;

FIG. 8 shows the configuration of a status register that may be used to control a configurable memory according to the present invention.

DETAILED DESCRIPTION OF THE PREFERRED EMBODIMENTS

Figure 7:
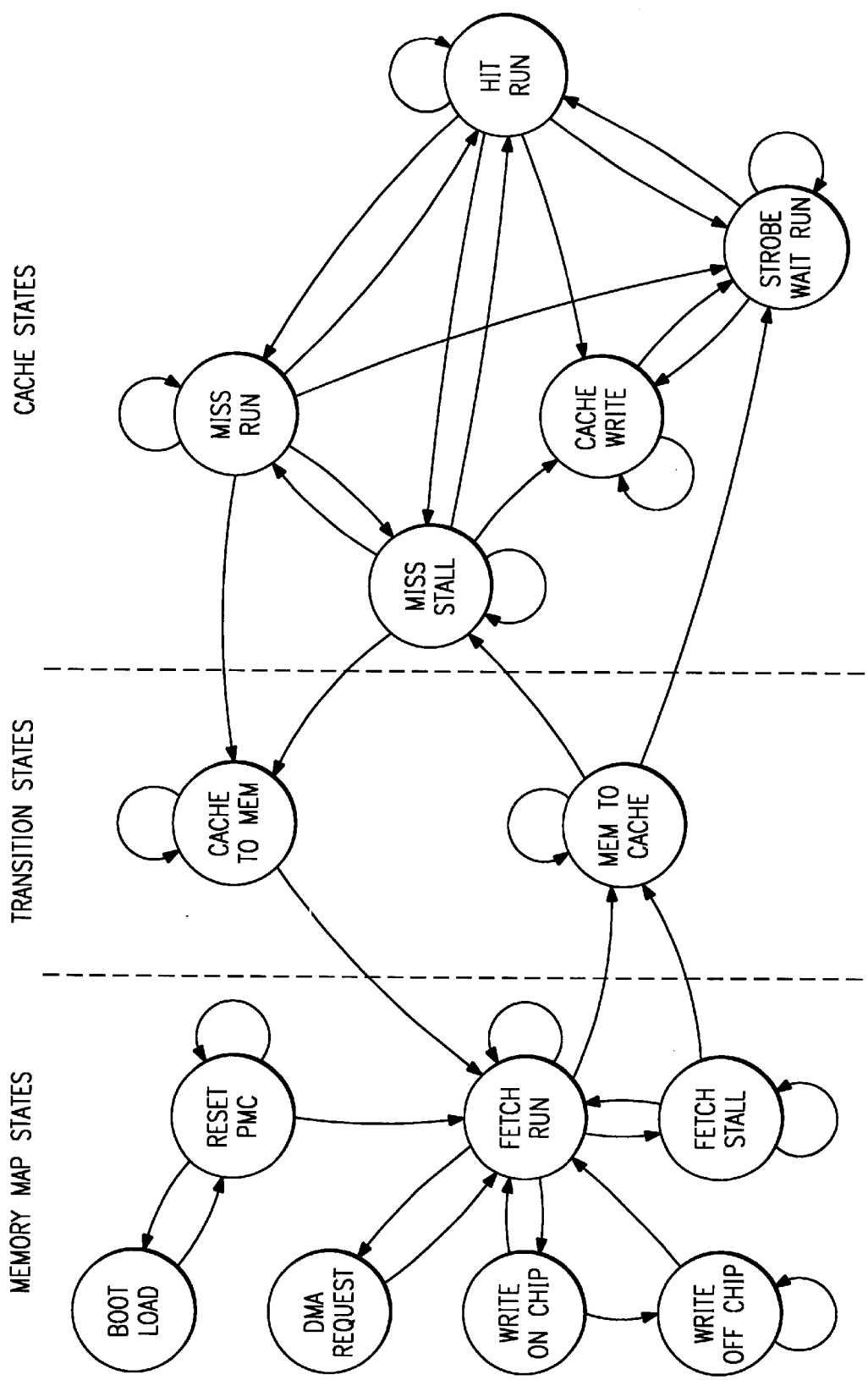
FIG. 7 illustrates the states and allowable state transitions for a program memory controller according to the present invention.

Several illustrative embodiments are described herein for the present invention. Although it is believed that the present invention may be readily adapted to virtually any CPU architecture, for illustrative purposes these embodiments are described with reference to a specific VLIW processor family, the Texas Instruments TMS320C6x. Those of ordinary skill in the pertinent art should comprehend the description below in sufficient detail to enable them to reproduce the invention; however, for specific data related to processor architecture, instruction set, and operation, the interested reader is referred to the *Texas Instruments TMS320C62xx CPU and Instruction Set Reference Guide* (1997) and the *Texas Instruments TMS320C62xx Peripherals Reference Guide* (1997), which are incorporated herein by reference.

Several definitions should also be useful to the reader. As used herein, an instruction is a function performable by an execution unit on a processor in one or more clock cycles. An execute packet is a set of one or more instructions that will be dispatched to the execution units during the same clock cycle. A fetch packet is a standard-sized block of instructions, comprising one or more execute packets, that is loaded into the CPU as a single unit.

A memory-mapped on-chip memory occupies a contiguous section of regularly addressable program memory. A cache on-chip memory contains a copy of instructions that also reside in external memory and that have been previously requested (usually those most recently requested) by the CPU. These do not necessarily represent a contiguous section of program memory, and are not generally explicitly addressable by the CPU.

The Texas Instruments TMS320C6x (C6x) processor family comprises several preferred embodiments of the present invention. The C6x family includes both scalar and floating-point architectures. The CPU core of these processors contains eight execution units, each of which requires a 31-bit instruction. If all eight execution units of a processor are issued an instruction for a given clock cycle, the maximum instruction word length of 256 bits (8 31-bit instructions plus 8 bits indicating parallel sequencing) is required.

A block diagram of a C6x processor connected to several external data systems is shown in FIG. 1. Processor 10 comprises a CPU core 20 in communication with program memory controller 30 and data memory controller 12. Other significant blocks of the processor include peripherals 14, a peripheral bus controller 17, and a DMA controller 18.

Processor 10 is configured such that CPU core 20 need not be concerned with whether data and instructions requested from memory controllers 12 and 30 actually reside on-chip or off-chip. If requested data resides on chip, controller 12 or 30 will retrieve the data from respective on-chip data memory 13 or program memory/cache 31. If the requested data does not reside on-chip, these units request the data from external memory interface (EMIF) 16. EMIF 16 communicates with external data bus 70, which may be connected to external data storage units such as a disk 71, ROM 72, or RAM 73. External data bus 70 is 32 bits wide.

CPU core 20 includes two generally similar data paths 24a and 24b, as shown in FIG. 1 and detailed in FIG. 2. The first path includes a shared multiport register file A and four execution units, including an arithmetic and load/store unit D1, an arithmetic and shifter unit S1, a multiplier M1, and an arithmetic unit L1. The second path includes register file B and execution units L2, S2, M2, and D2. Capability (although limited) exists for sharing data across these two data paths.

Because CPU core 20 contains eight execution units, instruction handling is an important function of CPU core 20. Groups of instructions are requested by program fetch 21 and received from program memory controller 30 as fetch packets. Instruction dispatch 22 distributes instructions from fetch packets among the execution units as execute packets, and instruction decode 23 decodes the instructions.

In the preferred embodiment, a fetch packet has a fixed length of eight instructions, as shown in FIG. 3. The execution grouping of the fetch packet is specified by the p-bit, bit zero, of each instruction. Fetch packets are eight-word aligned in program memory.

The p-bit controls the parallel execution of instructions. The p-bits are scanned from left to right (lower to higher address) by instruction dispatch 22. If the p-bit of instruction i is 1, then instruction i+1 is to be executed in parallel with instruction i, i.e., in the same execute packet. Thus an execute packet may contain from one to eight instructions, and a fetch packet may contain from one to eight execute packets, depending on the size of the execute packets. All instructions in an execute packet must utilize a unique execution unit. An execute packet also cannot cross an eight-word boundary. Thus, the last p-bit in a fetch packet is always set to 0, and each fetch packet starts with a new execute packet.

Because of this variable execute packet length and fixed fetch packet length, on-chip program memory 31 in the preferred embodiment is aligned by fetch packets. If an instruction that resides in the middle of a fetch packet is requested by the CPU, the entire fetch packet is retrieved, but all instructions at lower addresses are ignored (even if they would have otherwise operated in parallel with the requested instruction).

The physically addressable address space of the C6x processor is 4 Gbytes. On-chip program memory 31 has a size of 64K bytes. However, each instruction requires four bytes, and each fetch packet contains eight instructions, such that on-chip program memory 31 is arranged as 2K frames, each frame holding one fetch packet of 32 bytes, or 256 bits, in length. In memory map mode, the 64K bytes of on-chip memory may be selected to reside at a contiguous block of memory in address space starting at address 140 0000, as shown in FIG. 4A, or at a starting address of 000 0000, as shown in FIG. 4B.

In cache mode, the representative embodiments assume that instructions will occupy a maximum external address space of 64 Mbytes. Thus the cache in these embodiments ignores the top six bits of an address in cache mode, as shown in FIG. 5. The cache also ignores the bottom five bits of an address, as the cache stores only fetch-packet-aligned (i.e. 32-byte-aligned) data. Bits 5 to 25 of an instruction address are the only bits used to map external address space into cache locations.

As shown in FIG. 5, bits 5 to 25 are divided within the program memory controller 30 into a ten-bit tag (bits 16–25) and an eleven-bit block offset (bits 5–15). The program memory controller 30 contains a tag RAM 32 (see FIG. 9) that is capable of storing 2K tags, one for each frame in memory 31, in order to track the contents of the cache. The eleven-bit block offset is used both as an address for the appropriate tag within tag RAM 32 and as an address for the appropriate frame within memory 31. Each eleven-bit location within tag RAM 32 contains a validity bit and a ten-bit tag. Although external addresses 64 k apart map to the same location in the tag RAM, each external address maps to a unique combination of block offset and tag.

When the cache is initialized and enabled, the validity bit at each tag location is marked invalid. Then, as each new fetch packet is requested, its address is partitioned within program memory controller 30 into a compare tag and a block offset. The block offset is used to retrieve a tag from tag ram 32. If the tag validity bit is invalid, it is set and the compare tag is written into the tag RAM using the block address as an offset, and a cache miss is declared. If the tag validity bit of the retrieved tag is set, the retrieved tag is compared to the compare tag in tag comparator 34. If the two tags fail to match, a cache miss is declared and the compare tag is written into the tag RAM using the block address as an offset. If the two tags are identical, comparator 34 registers a cache hit and the tag RAM is not modified.

If a cache hit occurs, the requested fetch packet is retrieved from on-chip memory 31 using the block offset as an address. With a cache miss, the requested fetch packet is retrieved by sending the external address to EMIF 16 for off-chip retrieval. As the instructions of the fetch packet are received from EMIF 16 they are written into on-chip memory 31 one 32-bit instruction at a time, using the block offset as an address. Once the entire fetch packet is received, it is sent to CPU core 20.

Although the cache is typically fully enabled during caching, several other cache modes are available to the user. Cache freeze mode operates similar to cache enable mode, except that the cache and tag RAM are never updated. This mode is useful for protecting valuable cache contents, e.g., during interrupt service. Cache bypass mode causes a cache miss on every fetch, effectively removing on-chip memory 31 from service.

During processor operation, on-chip memory operations are preferably transparent to the CPU, such that program data requests and program data stores are handled in a uniform fashion. Referring now to FIG. 6, program memory controller 30 and CPU core 20 interface with a program address bus 44, a program data bus 43, and several control signals. The PROGRAM ADDRESS STROBE (PAS) signal is sent by CPU core 20 when it places an instruction request on the program address bus. The PROGRAM DATA STROBE (PDS) signal is sent by the CPU when it needs program data (this typically occurs one to eight CPU cycles after the PAS signal is sent). The PROGRAM WRITE STROBE (PWS) signal is sent by the CPU when it desires to write data to program memory. Program memory controller 30 uses the RDY signal to acknowledge that it is supplying requested fetch packets as needed. The RDY signal is taken low to stall CPU core 20 if program memory controller 30 cannot produce the program data when the PDS requests it. The RDY signal may also be taken low at other times, as described below.

FIG. 7 illustrates the states and allowable state transitions for the program memory controller of the C6x processor embodiment. These states may be divided generally into three categories as shown: memory map states, cache states, and transition states. A description of each state and its corresponding state transition conditions follows.

Program Memory Controller Operation in Memory Map Mode

Referring again to FIG. 7, RESET PMC is the boot state of program memory controller 30. Program memory controller 30 typically stays in this state whenever the RESET pin of the processor is asserted. However, program memory controller 30 may transition to a BOOT LOAD state from RESET PMC if the DMA provides a request during RESET. During BOOT LOAD, the DMA may store data into the on-chip memory. Once the DMA request has been serviced in BOOT LOAD, program memory controller 30 transitions back to RESET PMC.

Upon release of RESET, program memory controller 30 transitions to memory map mode and the FETCH RUN state. FETCH RUN is the default state of program memory controller 30 in memory map mode. Program memory controller 30 idles in this state until a request is received. If CPU core 20 has requested a fetch packet by asserting PAS, program memory controller 30 determines if the address on bus 44 is an on-chip memory address. If the address is an on-chip address, the requested fetch packet is placed on the program data bus. If the address is an off-chip address, program memory controller 30 sends the address to the EMIF for program data retrieval.

Program memory controller 30 transitions from FETCH RUN to FETCH STALL if the requested fetch packet has not been retrieved before CPU core 20 indicates it needs the data by asserting PDS (typically one to eight clock cycles after CPU core 20 asserts PAS). In FETCH STALL, program memory controller 30 halts CPU core 20 by deasserting the RDY signal until the requested fetch packet has been received. Once program memory controller 30 retrieves the fetch packet, program memory controller 30 transitions back to FETCH RUN and RDY is reasserted.

Program memory controller 30 may also transition from FETCH RUN to WRITE ON CHIP if a store program (STP) instruction is executed by CPU core 20. The STP instruction causes CPU core 20 to assert PWS, indicating to program memory controller 30 that an instruction write is requested. In WRITE ON CHIP, the program address on address bus 44 is evaluated by program memory controller 30; if it is a valid on-chip address, the instruction on program data bus 43 is written into on-chip memory 31 and program memory controller 30 transitions back to FETCH RUN. If the address is an off-chip address, program memory controler 30 transitions to WRITE OFF CHIP. In either case, WRITE ON CHIP is a one-cycle state. RDY is deasserted in this state.

The WRITE OFF CHIP state is only entered from WRITE ON CHIP, and RDY remains deasserted in this state. WRITE OFF CHIP passes the instruction address and data to the EMIF for writing. Program memory controller 30 remains in this state until the EMIF has written the data, and then transitions back to FETCH RUN.

The final memory mode state is DMA REQUEST. DMA controller 18 can write to on-chip memory during this one-cycle state. However, CPU core 20 is given priority over DMA controller 18, and no transition from FETCH RUN to DMA REQUEST will occur as long as CPU core 20 has pending requests. Note also that no corresponding state exists for cache operation—as the cache stores a copy of off-chip memory, the results of a write only to on-chip cache would be unstable. Thus, DMA requests in cache mode are ignored. As an alternative, the DMA request could be handled similar to STP requests in cache mode (see the CACHE WRITE state below).

Program Memory Controller Operation in Cache Mode

Program memory controller 30 has a separate set of states for memory and cache modes, although functional similarities exist between the two modes. The resting cache mode state is STROBE WAIT RUN; program memory controller 30 returns to this state when there are no pending fetches, and remains in this state until the CPU asserts PAS or PWS.

When the CPU asserts PAS, program memory controller 30 transitions to HIT RUN. In this state, program memory controller 30 determines if the cache contains a valid replica of the requested fetch packet. If it does, a cache hit is declared and the packet is returned from the cache, and program memory controller 30 transitions back to STROBE WAIT RUN unless another request is pending. If the requested fetch packet is not in the cache, program memory controller 30 declares a miss and transitions to MISS RUN. RDY remains asserted in HIT RUN.

In MISS RUN, RDY remains asserted as program memory controller 30 fetches the requested packet from off-chip via the EMIF. In this state, if the cache is fully enabled the tag RAM will be updated and the packet will be written into the corresponding cache location as it is received from off-chip. Program memory controller 30 remains in MISS RUN until the entire packet is fetched, unless CPU core 20 requests the fetch packet data before the fetch is completed, in which case a transition to MISS STALL occurs. Once the fetch is completed, program memory controller 30 may transition back to STROBE WAIT RUN if no further requests are pending, to HIT RUN if an in-cache request is pending, or remain in MISS RUN if an off-chip request is pending.

If CPU core 20 requests off-chip data before it has been completely retrieved, program memory controller 30 transitions to MISS STALL, deasserts RDY, and stalls CPU core 20 until the fetch has completed. Once the off-chip fetch is completed, program memory controller 30 transitions to MISS RUN if an additional off-chip request is pending; otherwise, it transitions to HIT RUN.

Program memory controller 30 may also transition from STROBE WAIT RUN, HIT RUN, or MISS STALL to CACHE WRITE if CPU core 20 asserts the PWS signal (the transition occurs after pending fetch requests are completed). In CACHE WRITE, CPU core 20 is stalled by deasserting RDY, and the data on program data bus 43 is written to the physical off-chip address appearing on program address bus 44. In this state, the tag associated with this address is cleared in the tag RAM. One alternative to clearing the tag would be to update the tag RAM and on-chip memory after writing the new value into off-chip memory.

Transitioning Between Cache and Memory Map Modes

Although the C6x has been designed to always boot the on-chip memory in memory map mode, one of the key features of the present invention is the ability to reconfigure on-chip memory during processor operation. Although this could be done with an externally-supplied signal, in the preferred embodiment CPU core 20 controls the mode of on-chip memory. As illustrated in FIG. 8, the C6x CPU Control Status Register (CSR) contains a PCC field that indicates the desired program memory mode, and is observable by the program memory controller. In the C6x, the PCC is implemented as a three-bit field with four valid values (the other four are reserved for future implementation of additional modes). PCC value 000 represents memory mapped mode, and is the reset state. PCC value 010 represents cache enabled mode. PCC value 011 represents cache freeze mode, where cache contents are retained and readable, but off-chip reads do not affect the cache. And PCC value 100 represents cache bypass mode, which essentially bypasses on-chip memory and forces all reads to come from off-chip.

The user may select a PCC value that provides best performance for an application or portion of an application then executing on the processor. The user typically changes the PCC value by reading the CSR, modifying the PCC field, and writing the modified contents back into the CSR. From the standpoint of program memory controller 30, the most significant PCC events are transitions between the memory map state and one of the cache states.

While in memory map mode, program memory controller 30 checks the value of PCC in FETCH RUN and FETCH STALL states. If the PCC changes to a cache state, after the current fetch request is completed program memory controller 30 will transition to MEM TO CACHE. MEM TO CACHE stalls CPU core 20 while it initializes tag RAM 32 by clearing the valid bit associated with each tag. Although different implementations are possible, the C6x clears the bits one tag per clock cycle. The PMC in the C6x remains in MEM TO CACHE for 2049 clock cycles, 2048 of these being required to clear the 2K tags in the tag RAM.

If no fetch requests were pending at the transition to MEM TO CACHE, program memory controller 30 transitions to STROBE WAIT RUN in cache mode after initializing the tag RAM. If a request was pending, program memory controller 30 transitions instead to MISS STALL.

Program memory controller 30 performs a similar check of PCC in cache mode. However, it will not transition to memory map mode until a cache miss occurs, i.e., transitions to the CACHE TO MEM state occur from the MISS RUN and MISS STALL states. In CACHE TO MEM, program memory controller 30 stalls CPU core 20. CACHE TO MEM clears up any pending fetch requests and then transitions to FETCH RUN in memory map mode.

In this embodiment, program controller 30 takes no action with regard to the on-chip memory upon transition from cache to memory map mode. Thus the user is responsible for insuring that the memory-map contents are not used without proper initialization. Other embodiments of CACHE TO MEM are possible, such as one that fills on-chip memory from a specified location in off-chip memory before transitioning to memory-map mode.

Figure 9:
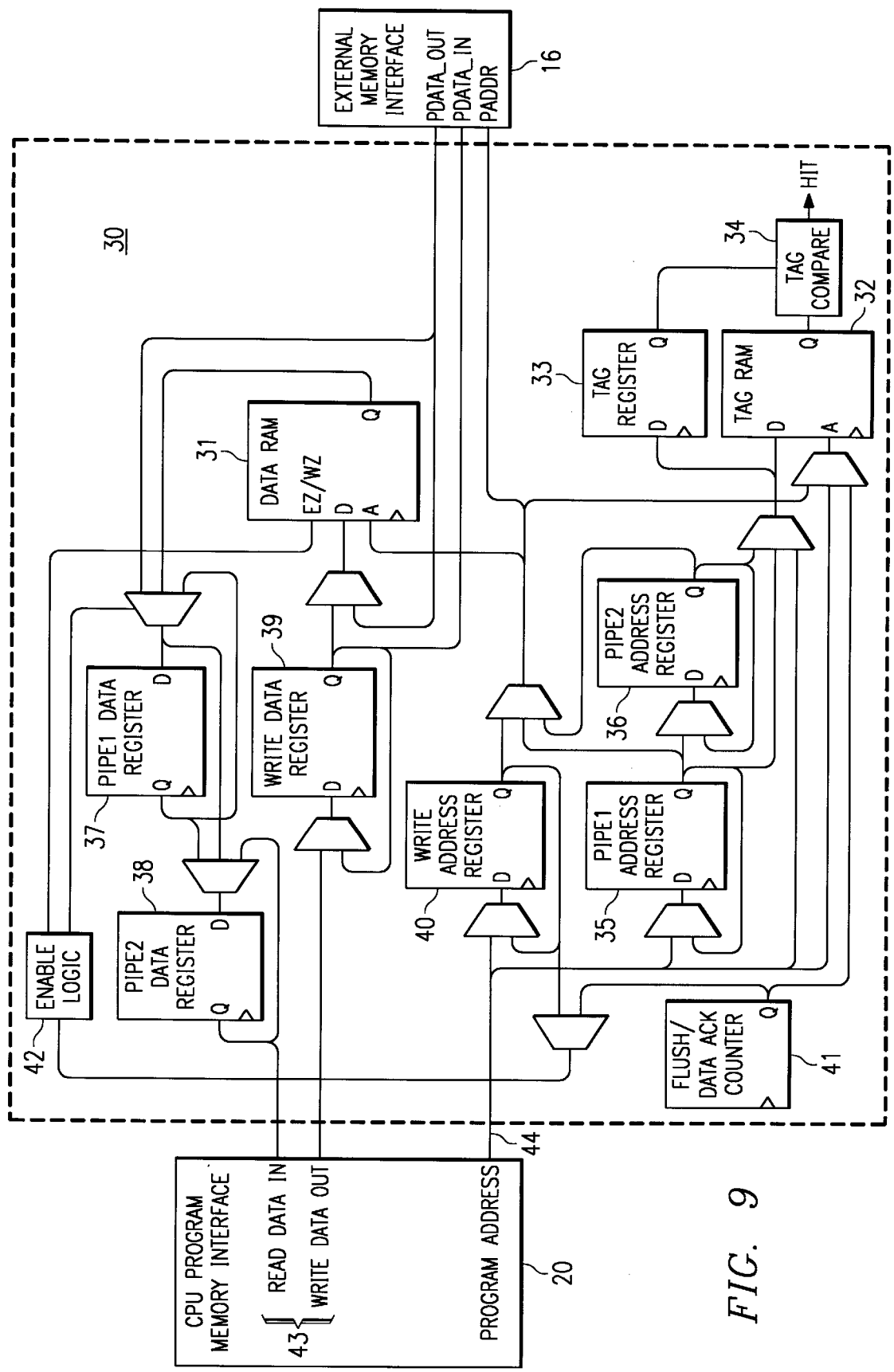
FIG. 9 shows the registers and data paths of a program memory controller according to the present invention.

The registers and data paths through program memory controller 30 are illustrated in FIG. 9. Because CPU core 20 is allowed to request a second fetch packet before it is ready to receive a first, two pipelined address registers 35 and 36 are used to handle multiple fetch requests. Likewise, both requests may be serviced (typically if both are on-chip) before CPU core 20 is ready for data, thus two pipelined data registers 37 and 38 are used to sequence retrieved data. Write data register 39 and write address register 40 are dedicated for program stores. Counter 41 is used for initializing tag ram 32, e.g. in the MEM TO CACHE state. FIG. 9 further illustrates how these registers are interconnected, and how the various data paths may be multiplexed to implement the functionality described in conjunction with FIG. 7.

Although the invention has been described herein with reference to a specific processor architecture, it is recognized that one of ordinary skill can readily adapt the described embodiments to operate on other processors, regardless of instruction size, on-chip or off-chip memory size, bus size, or utilization of instruction pipelining, and such adaptations are intended to fall within the scope of the invention. Likewise, nothing in this description should be seen as limiting the possible memory modes of a processor employing a user-configurable memory according to the present invention. For instance, other modes such as explicit boot modes, other known caching modes, and partitioned on-chip modes (multiple cache or part-mapped/part-cache) may be implemented using this disclosure. And although the preferred embodiments have been described using a specific controller design, those of ordinary skill will recognize upon reading this disclosure that the basic idea of a configurable on-chip memory may be logically implemented in many equivalent designs. Other obvious modifications will be apparent to those of ordinary skill in the art upon reading this disclosure; such are also intended to fall within the scope of the present invention.

What is claimed is:

1. A microprocessor comprising:

a central processing unit;

an on-chip memory array for storing instructions executable on said central processing unit;

an external memory interface capable of reading from and writing to an off-chip memory instructions executable on said central processing unit; and a configurable program memory controller in communication with said central processing unit, said on-chip memory array, and said external memory interface, said configurable program memory controller having a plurality of operating modes, including a first mode in which it uses said on-chip memory array as a memory-mapped on-chip memory, and a second mode in which it uses said on-chip memory array as a cache on-chip memory, said configurable program memory controller operable to transition between said second mode to said first mode only following a cache miss.

2. The microprocessor of claim 1, further comprising:

a cache tag memory having a plurality of validity bits, each validity bit indicating a valid state or an invalid state for a corresponding portion of said on-chip memory array; and wherein said configurable program memory controller is further operable to always reset all validity bits to indicate said invalid state upon each and every transition from said first mode to said second mode.

3. A microprocessor comprising:

a central processing unit;

an on-chip memory array for storing instructions executable on said central processing unit;

an external memory interface capable of reading from and writing to an off-chip memory instructions executable on said central processing unit; and a configurable program memory controller in communication with said central processing unit, said on-chip memory array, and said external memory interface, said configurable program memory controller having a plurality of operating modes, including a first mode in which it uses said on-chip memory array as a memory-mapped on-chip memory, and a second mode in which it uses said on-chip memory array as a cache on-chip memory, said configurable program memory controller operable to always load said on-chip memory from predetermined locations of off-chip memory via said external memory interface upon each and every transition between said second mode to said first mode.

4. The microprocessor of claim 3, further comprising:

a cache tag memory having a plurality of validity bits, each validity bit indicating a valid state or an invalid state for a corresponding portion of said on-chip memory array; and wherein said configurable program memory controller is further operable to always reset all validity bits to indicate said invalid state upon each and every transition from said first mode to said second mode.

5. A method of operating a microprocessor having a central processing unit, an on-chip memory operable in a first mode and a second mode and an external memory interface capable of reading from and writing to off-chip memory, the method comprising the steps of:

operating said on-chip memory as a memory-mapped memory having a predetermined range of addresses when in said first mode;

operating said on-chip memory as a cache memory when in said second mode; and transiting from said second mode to said first mode only following a cache miss.

6. The method of operating a microprocessor of claim 5, further comprising the step of:

always indicating all data within said on-chip memory is invalid upon each and every transition from said first mode to said second mode.

7. A method of operating a microprocessor having a central processing unit, an on-chip memory operable in a first mode and a second mode and an external memory interface capable of reading from and writing to off-chip memory, the method comprising the steps of:

operating said on-chip memory as a memory-mapped memory having a predetermined range of addresses when in said first mode;

operating said on-chip memory as a cache memory when in said second mode; and always loading said on-chip memory from predetermined locations of said off-chip memory via said external memory interface upon transiting from said second mode to said first mode.

8. The method of operating a microprocessor of claim 6, further comprising the step of:

always indicating all data within said on-chip memory is invalid upon each and every transition from said first mode to said second mode.

* * * * *